United States Patent
Riikonen

[11] Patent Number: 6,102,361
[45] Date of Patent: Aug. 15, 2000

[54] FLUIDIC PINCH VALVE SYSTEM

[76] Inventor: Esko A. Riikonen, 10441 Waterfowl Ter., Columbia, Md. 21044

[21] Appl. No.: 09/263,515

[22] Filed: Mar. 5, 1999

[51] Int. Cl.⁷ ........................................ F16K 7/04
[52] U.S. Cl. .................................................. 251/5
[58] Field of Search ............................. 251/4, 5

[56] References Cited

U.S. PATENT DOCUMENTS

| | | | |
|---|---|---|---|
| 4,191,358 | 3/1980 | Ferri | 251/5 |
| 5,253,704 | 10/1993 | Barrus et al. | 251/5 |
| 5,535,983 | 7/1996 | Hohemuth | 251/5 |

*Primary Examiner*—Kevin Shaver
*Assistant Examiner*—David A. Bonderer
*Attorney, Agent, or Firm*—Rosenberg, Klein & Lee

[57] ABSTRACT

There is provided a fluidic pinch valve system 10 for interrupting the flow of material through a conduit assembly. The fluidic pinch valve system 10 generally includes a substantially rigid valve body 100; an axially extended tube member 200 disposed within the valve body 100; and, an injection mechanism 300 coupled to the valve body 100 for injecting a fluid therein. The valve body 100 includes first and second ends and a wall portion 110 extending therebetween. Within the wall portion 110 is formed a bore extending axially from the first end to the second end. An injection port 140 is formed through the wall portion 110 to be in open communication with the bore. The tube member 200 is disposed within the valve body's bore and is formed having distal first and second sealing portions 120a, 120b and a sidewall portion 210 extending therebetween to define an axial passage. The first and second sealing portions maintain substantially flush engagement, respectively, with the first and second ends of the valve body 100. The sidewall portion 210 includes a flex section that is reversibly collapsible, responsive to a fluidic force imparted thereon, to a pinched configuration in which it is adapted to substantially constrict the axial passage.

9 Claims, 4 Drawing Sheets

FLUIDIC PINCH VALVE SYSTEM

BACKGROUND OF THE INVENTION

1. Field of the Invention

The subject fluidic pinch valve system is generally directed to a system for interrupting the flow of material through a conduit assembly. More specifically, the fluidic pinch valve system is a readily interchangeable system that may be driven by fluidic pressure to constrict the given material's flow path.

In the transport of various materials through pipelines, inlet/outlet ports, and other conduit assemblies, it is extremely important to simply yet efficiently enable and disable, as necessary, the material's flow. A number of valve system types are known in addition to pinch valve systems to effect such material flow control. They include ball, plug, and gate type valve systems.

Except in applications presenting the most benign of operating conditions, however, such valve system types are typically of limited utility. For instance, where the flowing material contains solid particulates, particulates may lodge between or accumulate on the relatively movable mechanical components of such valve systems. This would interfere with, if not altogether halt, the system's operation. Pinch valve type systems are, therefore, often preferred in numerous applications.

Pinch valve systems, though, are not immune from significant limiting factors of their own. Pinch valve systems generally operate by pinching the material flow path to a close. This requires some degree of flexibility in that segment of the conduit assembly being pinched. Accordingly, a rubber or other elastic material-containing sleeve member is typically employed in pinch valve systems. To satisfy the strength, structural integrity, and durability requirements in many applications, however, the sleeve member must be reinforced by incorporating therein fibrous material such as fiberglass, kevlar, carbon fibers, and the like. The very inelasticity which enable these fibrous materials to serve their reinforcing function remains naturally at odds with the elastic component of the sleeve member, such that repeated pinching, particularly under harsh operating conditions, tends to induce the sleeve member's premature failure. The fibrous material is actually incorporated in many cases into a separate reinforcing layer which progressively separates from the more elastic of the sleeve member's layers when subjected to repeated pinching.

The substantial inelasticity of the reinforcing fibrous material gives rise to another limiting factor for pinch valve systems. A sleeve member is only as elastic as its least elastic layer(s). While measures such as the weaving arrangement of the fibrous reinforcing material may be employed to augment the stretchability of any reinforcing layer, such would tend to compromise the reinforcing capacity of the layer. Even with measures taken to augment its stretchability, then, a reinforced sleeve member must be of sufficiently greater dimension in axial length than in transaxial or diametric width to permit adequate pinching. Pinch valve systems incorporating such reinforced sleeve members are, for that reason, far greater in axial length than comparable valve systems of other type. They cannot be employed to replace existing valve systems of different type without also employing extensive retrofitting or customizing measures. This is especially so since in many applications, valve system dimensions are governed by universal standards that foreclose the high length-to-diameter ratios necessarily characterizing such pinch valve systems.

A third limiting factor plaguing known pinch valve systems derives from their requisite need to stretch a reinforced sleeve member. A sufficiently reinforced sleeve member tends to be highly resistant to the stretching required for pinching action. This imposes heightened requirements upon the actuator employed for driving the pinching action. Thus, a mechanical actuator is typically employed, so as to insure adequate pinching, or constriction, of the material flow path.

Mechanical application of force upon a sleeve member presents yet another potentially limiting factor for known pinch valve systems. The moving mechanical parts it inherently requires introduce into the resulting valve system undue complexity, unnecessarily heightening the potential for system failure. Despite the most carefully implemented preventive measures, moreover, dust or other particulates invariably accumulate on and lodge between the moving parts.

There is, accordingly, a need for a modular pinch valve system that is substantially immune to premature failure of its pinchable sleeve member. There is a need for such a pinch valve system having a sufficiently low axial length-to-width or length-to-diameter ratio comparable to those of other valve system types. There is a further need for such a pinch valve system which is readily actuable by non-mechanical means.

2. Prior Art

Pinch valve systems are known in the prior art. The most relevant prior art known to Applicant includes U.S. Pat. No. 5,207,409; No. 5,036,287; No. 4,906,917; No. 4,824,072; No. 4,642,833; No. 4,372,528; No. 4,345,735; No. 4,330,101; No. 4,310,140; No. 4,205,697; No. 4,191,358; No. 4,191,391; No. 4,108,418; No. 4,092,010; No. 3,965,925; No. 3,831,085; No. 3,826,461; No. 3,775,680; No. 3,640,354; and, No. 3,197,173. None of the prior art systems, however, incorporates the combination of features now incorporated by the subject fluidic pinch valve system.

For instance, U.S. Pat. No. 5,207,409 earlier issued to the inventor of the subject fluidic pinch valve system discloses an interchangeable pinch valve system wherein the pinching action is actuated by mechanical means. The system employs a pinch bar assembly that includes a pair of valve closing members which mechanically engage and pinch to a close a flexible sleeve member that otherwise serves as a segment of the given conduit for material flow.

SUMMARY OF THE INVENTION

A primary object of the present invention is to provide a modular pinch valve system which may be readily actuated by fluidic force to constrict a given material's flow path.

Another object of the present invention is to provide a pinch valve system that is modularly interchangeable with valve systems of other type.

Another object of the present invention is to provide a pinch valve system wherein the pinching occurs along a laterally directed constriction seam responsive to a fluidic force.

It is yet another object of the present invention to provide a pinch valve system of high strength, durability, and reliability.

It is still another object of the present invention to provide a pinch valve system that is both simple in structure and operation.

These and other objects are attained in a fluidic pinch valve system formed in accordance with the present invention. The subject fluidic pinch valve system generally comprises a substantially rigid valve body; an axially extending tube member disposed within the valve body; and, an injection mechanism also coupled to the valve body for injecting a fluid therein. The valve body includes first and second ends and a wall portion extending therebetween. Within the wall portion is formed a bore extending axially from the first end to the second end. An injection port is formed through the wall portion to be in open communication with the bore. The tube member is disposed within the valve body's bore and is formed having distal first and second sealing portions and a sidewall portion extending therebetween to define an axial passage. The first and second sealing portions maintain substantially flush engagement, respectively, with the first and second ends of the valve body. The sidewall portion includes a flex section that is reversibly collapsible, responsive to a fluidic force imparted thereon, to a pinched configuration in which it is adapted to substantially constrict the axial passage.

In one embodiment, the tube member is formed with a flex section that includes at least a pair of deformable annular ridges and a deformable constriction segment disposed therebetween. The constriction segment collapses responsive to the fluidic force to a linearly extended sectional contour when the flex section collapses to the pinched configuration. The constriction segment is biased such that this linearly extended sectional contour is oriented in a predetermined transaxial direction.

DETAILED DESCRIPTION OF THE PREFERRED EMBODIMENTS

Figure 1A:
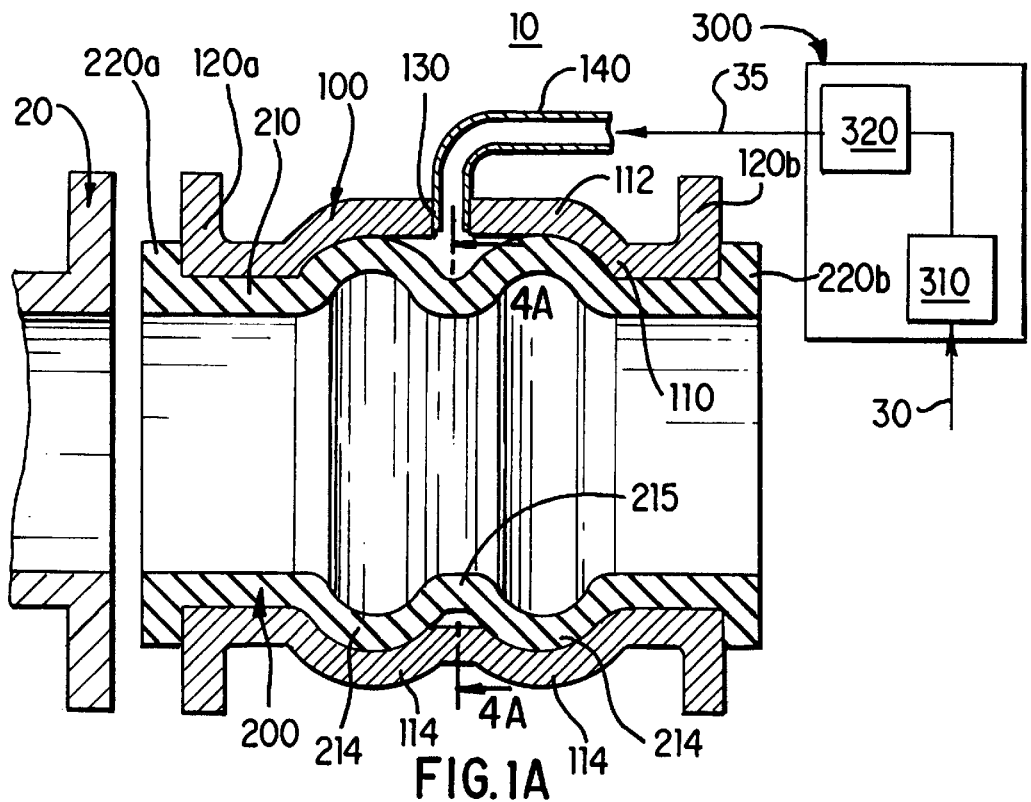
FIG. 1A is a schematic diagram of one embodiment of the present invention, including a sectional view, partially cut-away, of a portion thereof prior to fluidic actuation.
Figure 1B:
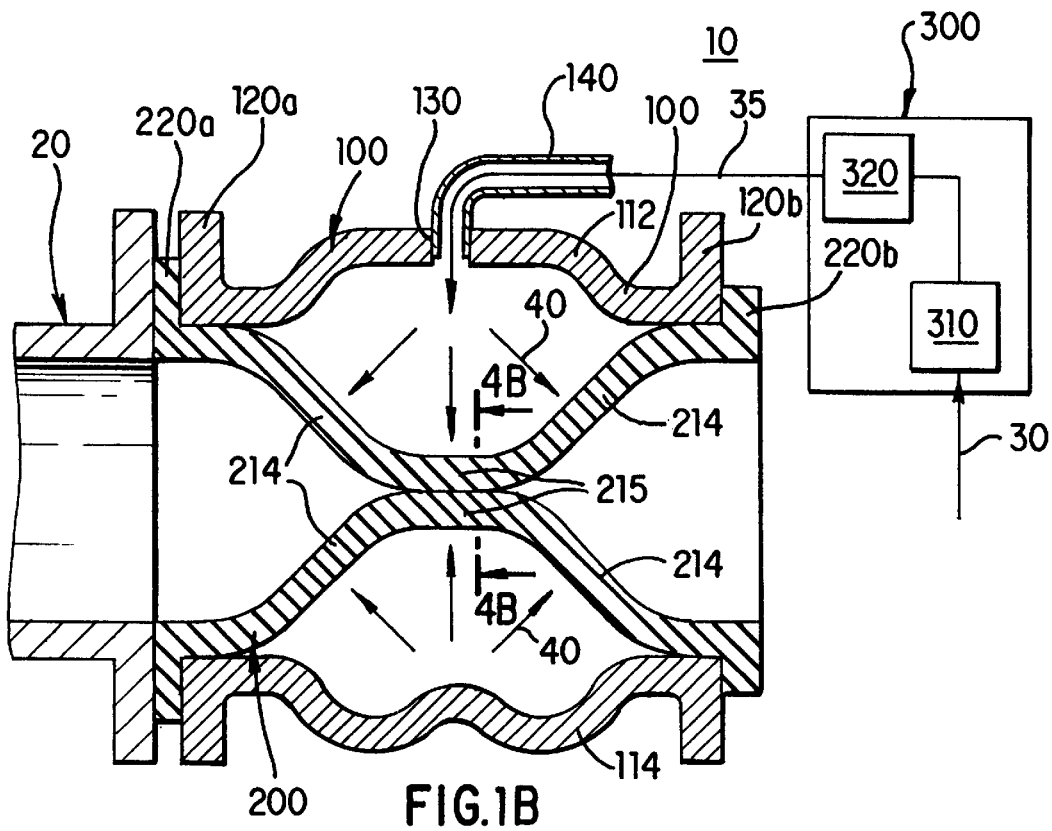
FIG. 1B is a schematic diagram of one embodiment of the present invention, including a sectional view, partially cut-away of a portion thereof during fluidic actuation.
Figure 2:
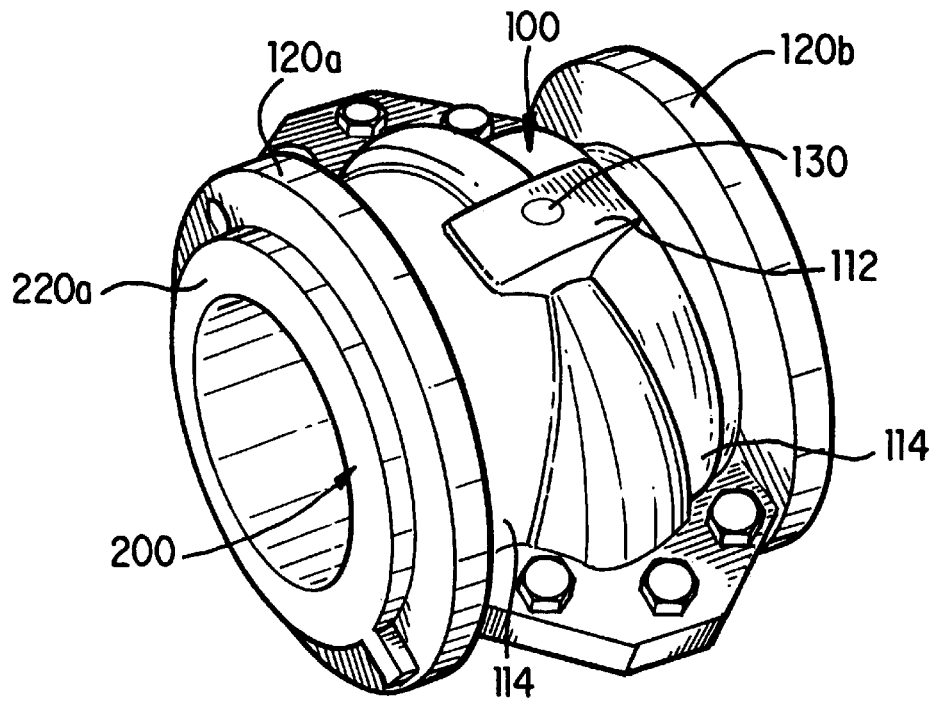
FIG. 2 is a perspective view of a portion of the embodiment of the present invention shown in FIG. 1A.
Figure 3:
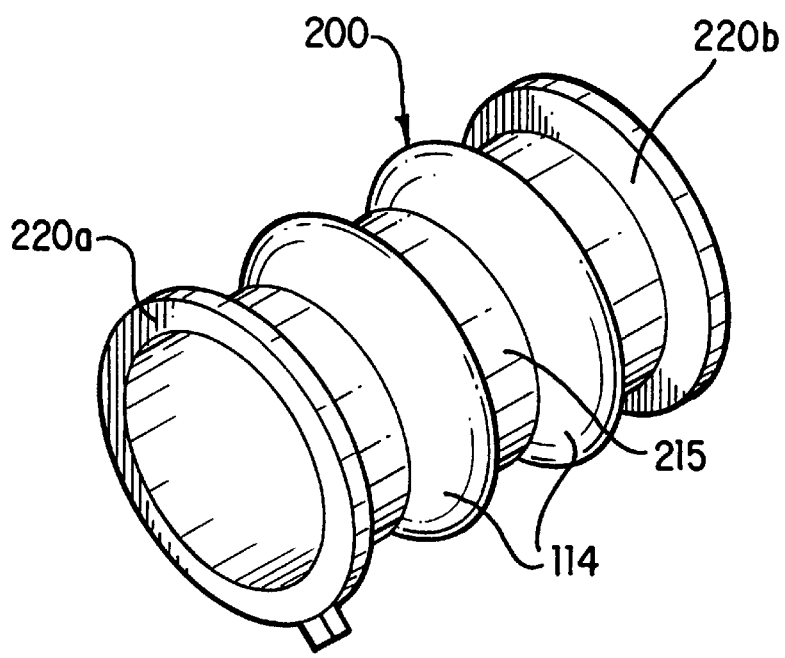
FIG. 3 is a perspective view of another portion of the embodiment of the present invention shown in FIG. 1A.

Referring now to FIGS. 1A–3, there is shown one embodiment of a fluidic pinch valve system 10 formed in accordance with the present invention. Fluidic pinch valve system 10 generally includes a valve body 100 having a bore extending axially therethrough from one end to the other, an axially extending tube member 200 disposed within the valve body's bore, and a fluid injector 300 operably coupled thereto. As a modular unit, fluidic pinch valve system 10 is adapted for coupling to or between components 20 (only one shown) of a pipeline or other conduit assembly. Once installed in the given conduit assembly, fluidic pinch valve system 10 serves as a conduit segment when free flow of a working material through the conduit assembly is to occur. When that free flow is to be interrupted, a suitable fluid is injected into valve body 100 such that an intermediate portion of tube member 200 collapses to sufficiently constrict the conduit segment flow path otherwise formed therethrough.

Valve body 100 is realized as a substantially rigid structure formed of any material known in the art to be suitable for the operating conditions to be encountered in the intended application. In exemplary applications, valve body 100 is preferably formed of steel or other composition of comparable strength, density, and durability sufficient to withstand the temperature and pressure extremes, or the repeated contact with potentially abrasive and corrosive materials, to be encountered during operation. Valve body 100 is formed with mounting flanges 120a, 120b which facilitate the secure coupling thereof to component 20 or other parts of the given conduit assembly. Extending axially between opposed mounting flanges 120a, 120b is a wall portion 100, an upper region 112 of which has formed therethrough an opening 130. An injection port 140 extends through this opening 130 to serve as a guide for the injection into the valve body bore of a pinch-actuating fluid. One or more regions 114 of wall portion 110 are contoured in predetermined manner to sufficiently accommodate the non-collapsed body contour of tube member 200.

Tube member 200 is preferably dimensioned and contoured to fit snugly within the bore of valve body 100. It may be formed of any material and structural configuration known in the art which renders it suitable for the environmental and operational extremes to be encountered in the intended application. Preferably, it is formed with at least one substantially elastic component such as rubber or other comparable material and at least one reinforcing component containing fibrous material such as fiberglass, kevlar, carbon fibers, and the like. While it is not delineated as such in FIGS. 1A–3, tube member 200 may be formed with a multi-layered construction wherein at least one substantially elastic layer of a suitably elastic composition is lined with a substantially inelastic reinforcement layer. The reinforcement layer would have incorporated therein a reinforcing fiber woven to permit a predetermined degree of flex in the layer.

Tube member 200 is preferably formed with a sidewall portion 210 terminating axially at first and second flanged ends 220a, 220b to define an axial passage therethrough. At an intermediate part of sidewall portion 210 is defined a flex section that preferably includes a pair of deformable annular ridges 214 and a deformable constriction segment 215 disposed therebetween. The flex section is adapted to reversibly collapse responsive to the force imparted thereon by the fluid injected via injection port 140 into and accumulated within the valve body bore. The force applied to the flex section by the injected fluid is illustrated by the plurality of directional arrows 40.

The contour and dimensions of the flex section are such that when a sufficient level of fluidic force is generated by the accumulation of injected fluid about it, as indicated by arrows 40, constriction segment 215 is fully deflected to substantially constrict the tube member's axial passage. The flex section is then in its collapsed, or pinched, configuration. Deflection of the flex section to this collapsed configuration is accommodated by the annular ridges 214 which provide sufficient slack in the tube member 200 sidewall material that the material may simply flex and extend, rather than stretch.

This is important for a number of reasons. It avoids the premature fatigue and failure of the material that invariably results from the repeated forcible stretching of the reinforcement or other inelastic material component/layer of tube member sidewall portion 210 were the collapse of constriction segment 215 effected in the absence of annular ridges 214 or other such provisions. The absence of any need for forcible stretching also eases the functional demands on the means for actuating the pinching action, as less force is required to flex, or extend, the sidewall material than to stretch it. Hence, greater durability and efficiency are realized in the subject fluidic pinch valve system 10.

Furthermore, far greater radial deflection is permitted for constriction segment 215 by the provision of annular ridges 214 or the like. Without them, a significantly greater axial extent of the sidewall 210 material is required to permit the stretched deflection of constriction segment 215 necessary for full constriction of the tube member's axial passage. This necessitates a greater overall axial dimension for the resulting pinch valve system. In many applications, this would cause the resulting pinch valve system to exceed the ASME, DIN, or other standards applicable thereto. The potential modularity of such a pinch valve system would then be wholly undermined, for it could not replace—without extensive customizing or retrofitting measures—valve systems that do comply with the applicable standards. The provisions made in accordance with the present invention afford in the subject pinch valve system 10 overall valve system dimensions fully compliant with ASME and other widely applicable standards.

When constriction of the material flow path is effected by a stretching of the tube member's sidewall material, moreover, the capacity of that material to withstand the material flow pressures bearing thereon is compromised by the material's stretching. The full capacity of tube member 200 to withstand the material flow pressures and thereby maintain adequate constriction is thus preserved in accordance with the present invention.

It is important in virtually all applications that a valve system be highly responsive. That is, the valve system must close off the given flow path, then re-open it—both in prompt manner when accordingly actuated. The degree of responsiveness in re-opening a once closed flow path is a particularly problematic factor in fluidically-actuated pinch valve systems such as the subject system 10, wherein no affirmative means is present for forcibly drawing open the flow path. In accordance with the present invention, annular ridges 214 serve to bias the flex section to a non-collapsed, or open, configuration. This obviates the need for means other than the reduction or elimination of the fluidic force to re-open the axial passage following a period of constriction. The tendency of the tube member to otherwise linger in the collapsed, or constricting, state is overcome by such bias.

Fluidic actuation of the pinching action in the subject fluidic pinch valve system 10 offers a number of advantages, not the least of which is the elimination of extraneous, moving mechanical components. This not only optimizes the overall simplicity of the system, it greatly enhances both the reliability and durability of the system. With the elimination of moving components comes the requisite elimination of potential malfunction or complete failure due to dust or other particulates disruptively lodging between or accumulating upon them. The elimination of mechanical components that would directly engage portions of tube member 200 also eliminates the abrasive contact that would otherwise result from repeated pinching cycles.

In accordance with the present invention, fluidic actuation may be effected by injecting either a gas or a liquid through injection port 140 at a predetermined injection pressure. Whether effected pneumatically or hydraulically, it is important that the space resulting between sidewall portion 210 of tube member 200 and wall portion 110 of valve body 100 be substantially sealed against leakage of the given fluid. Only then, may the injected fluid accumulate and transmit to the flex section a substantial pressure to force its collapsing deflection.

Accordingly, tube member 200 has formed at each of its axial ends a resilient sealing portion. Each sealing portion preferably includes an annular flange 220a, 220b directed radially outward to partially overlap and engage in substantially flush manner a mounting flange 120a, 120b of valve body 100. When fluidic pinch valve system 10 is then coupled to a conduit assembly component 20, the given flange 220a is captured and compressed between mounting flange 120a of valve body 100 and the opposing mounting flange of that component 20. A highly secure sealing against leakage of the injected fluid is thus realized.

It is to be understood that while coupling to only one conduit assembly component 20 is shown, a like coupling to a second conduit assembly component 20 may be made at the opposing axial end of valve body 100. Also, component 20 may be of any suitable structure and construction other than that shown for illustrative purposes.

The injection of fluid required for actuation of the pinching action is controlled and regulated by a fluid injector 300 operably coupled to injection port 140. Injector 300 may, if necessary, include its own pump or other fluid pressure generating device. A source of pressurized pneumatic or hydraulic fluid is in many applications already provided at the given site. In any case, fluid injector 300 includes a filter-regulator 310 which receives the pressurized fluid, as indicated by directional arrow 30, and passes the filtered and regulated fluid stream to a valve mechanism 320 which then selectively directs the fluid stream into injection port 140, as indicated by directional arrow 35.

Filter-regulator 310 may be any suitable device known in the art and commercially available. For instance, it may, in pneumatic applications, be the B35 integral filter/regulator manufactured by Watts FluidAir, Inc., of Kittery, Me. Alternatively, the filter and regulator may be implemented in separate devices such as the F35 filter and the R35 regulator, both also manufactured by Watts FluidAir, Inc.

Valve device 320 may be any device known in the art and commercially available that is suited for the intended application. For instance, it may be a three-way solenoid-operated valve (34 series, 35 series, 100 series, or 200 series) manufactured by MAC Valves of Wixom, Mich., or other such device. In the alternative, filter-regulator 310 and valve device 320 may be realized in a single device such as the PPC5A series proportional pressure controller also manufactured by MAC Valves.

Figure 4A:
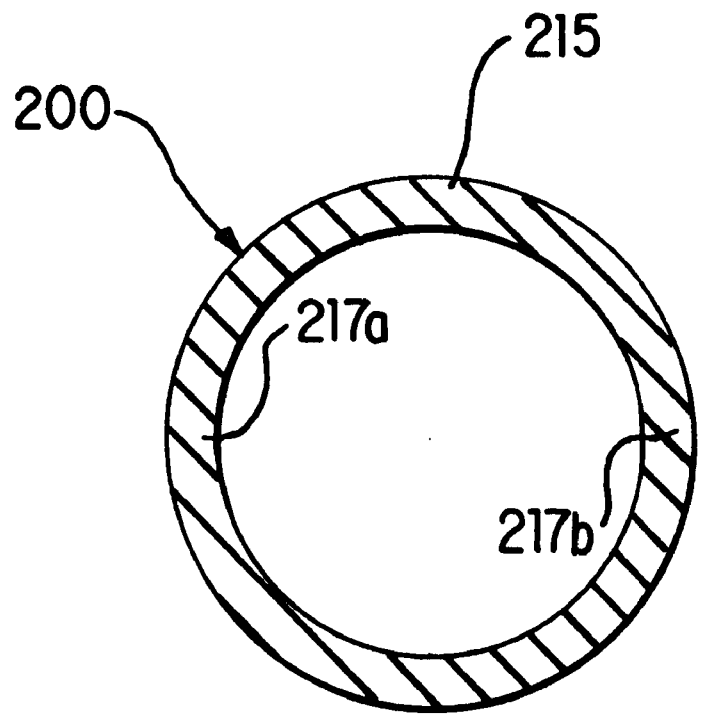
FIG. 4A is a sectional view of a portion of the embodiment of the present invention shown in FIG. 1A.
Figure 4B:
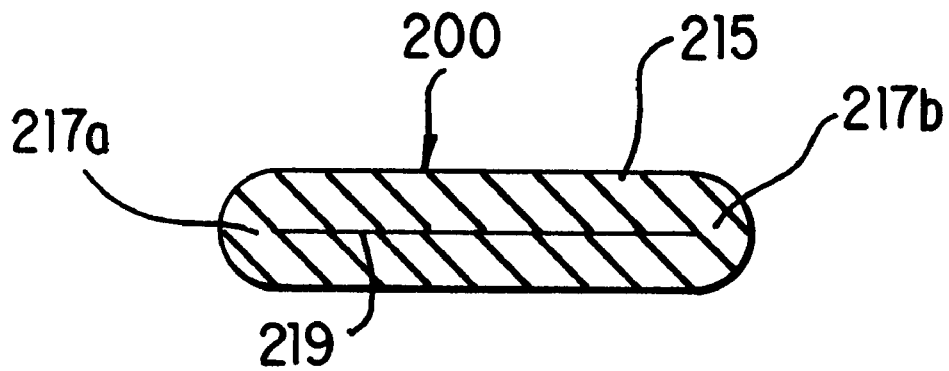
FIG. 4B is a sectional view of a portion of the embodiment of the present invention shown in FIG. 1B.

Turning next to FIGS. 4A–4B, there is shown a sectional view of constriction segment 215 of tube member 200 in the open (FIG. 4A) and closed (FIG. 4B) configurations. In many applications, it is highly desirable to pinch constriction segment 215 along a laterally directed constriction seam 219. Where residuous particulates are carried in the material flowing through the given conduit assembly, residue invariably settles and lodges in the crease formed at the lowermost end of the constriction seam 219, where that constricted seam 219 is vertically directed (or inclined). Even if insignificant amounts of residue are thus lodged in any given pinch-open cycle, a progressive accumulation of such lodged residue invariably results with operation over an extended period of time, progressively compromising the tube member's ability to fully constrict the axial passage.

To insure that constriction segment 215 collapses along a laterally-extended constriction seam 219—that is, to a linearly extended sectional contour oriented in a lateral direction; constriction segment 215 is biased accordingly. Any of numerous biasing means may be employed. For example, a repetitive series of conditioning pre-manipulations may be performed to effectively 'break in' the constriction segment 215, so that it may bend and fold at regions 217*a*, 217*b*. Also, the thickness of sidewall portion 210 may be minimized at those diametrically opposed lateral regions 217*a*, 217*b* of constriction segment 215. For example, at least a pair of such opposed lateral regions 217*a*, 217*b* may each be formed with a thickness dimension less than the average thickness dimension, overall, of constriction segment 215. The choice of actual means by which constriction segment 215 is biased to collapse along a laterally-extended constriction seam 219 is not important to the present invention, so long as it does not detrimentally affect other aspects of a system 10 formed in accordance with the present invention.

Figure 5:
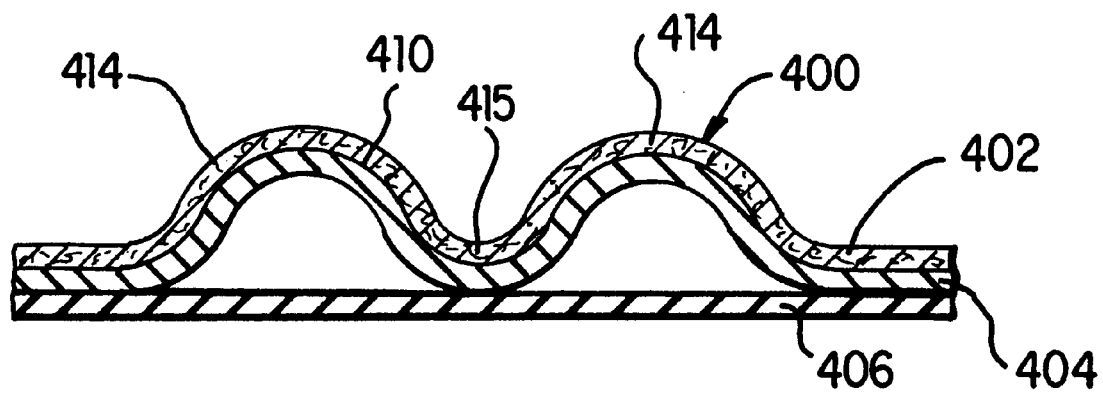
FIG. 5 is an axial sectional view, partially cut-away of a tube member flex section in an alternate embodiment of the present invention; and, FIG. 6 is a transaxial sectional view of a tube member constriction segment in the embodiment of the present invention shown in FIG. 5.
Figure 6:
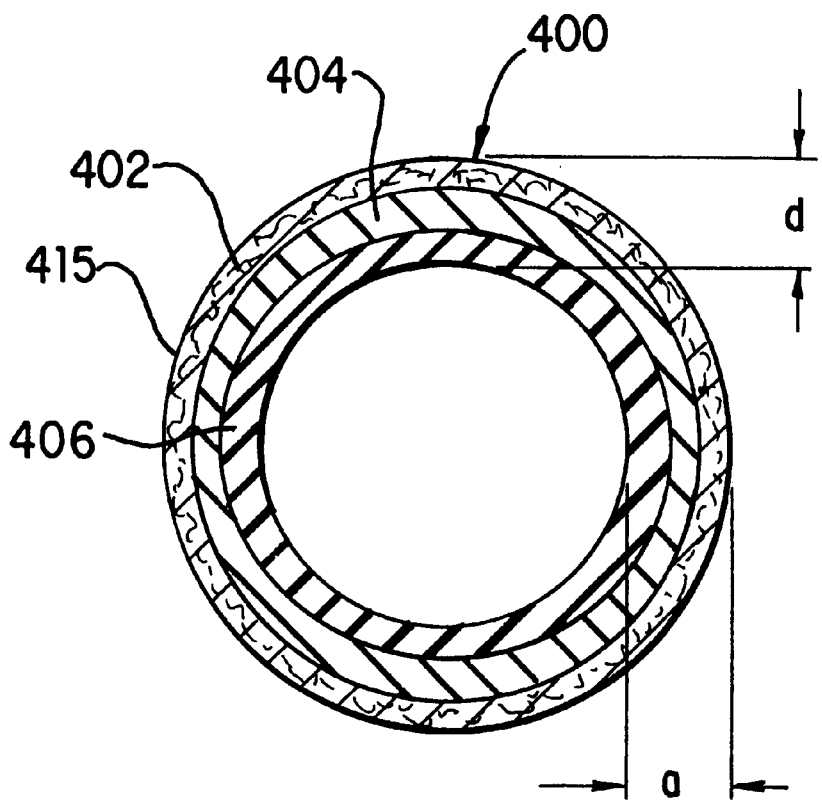

Referring now to FIGS. 5–6, there is shown a tube member 400 formed in accordance with another embodiment of the present invention. Tube member 400 includes a sidewall portion 410 formed with a multi-layer construction that includes a reinforcement layer 402, a primary elastic layer 404, and—extending axially through the flex section at least—a secondary elastic layer that serves essentially as an inner liner. As in the preceding embodiment, the flex section of sidewall portion 410 includes a pair of annular ridges 414 between which a constriction segment 415 is disposed. The additional elastic layer 406 prevents any turbulent disturbance that may result when the material flowing through the axial passage of tube member 400 enters the annular space immediately beneath each annular ridge 414. Where the operating conditions are such that detrimental effect is likely to be significant, the lining layer 406 covers the annular spaces beneath ridges 414 to maintain the streamlined material flow.

Upon the collapse of constriction segment 415, lining layer 406 is caused to stretch. Lining layer 406 is preferably formed of an elastic rubber composition or the like, however, well-adapted to stretching such that the threat of premature material fatigue and failure does not amount to a significant consideration.

As shown in FIG. 6, biasing of constriction segment 415 in this embodiment is effected by appropriately setting the cumulative wall thickness at different regions thereof. The cumulative thickness dimension a for the diametrically opposed lateral regions of constriction segment 415 is made sufficiently less than the thickness dimension d at other regions. Consequently, constriction segment 415 tends to bend and crease at its laterally opposed regions (having the lesser thickness dimension a) so as to collapse to a laterally-oriented sectional contour.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described; certain features may be used independently of other features; and, while circular sectional contours are shown for the valve body, tube member, and components of the given conduit assembly, other non-circular sectional contours may be readily employed; all without departing from the spirit or scope of the invention as defined in the appended claims.

What is claimed is:

1. A fluidic pinch valve system comprising:
   (a) a substantially rigid valve body having distal first and second ends and a wall portion extending therebetween, said valve body having a bore extending axially from said first end to said second end, said valve body having an injection port formed through said wall portion, said injection port being in open communication with said bore;
   (b) an axially extended tube member disposed within said bore, said tube member having distal first and second sealing portions and a sidewall portion extending therebetween to define an axial passage, said first and second sealing portions being in substantially flush engagement respectively with said first and second ends of said valve body, said sidewall portion including a flex section reversibly collapsible to a pinched configuration responsive to a fluidic force, said flex section including at least a pair of deformable annular ridges and a deformable constriction segment disposed therebetween to substantially constrict said axial passage when in said pinched configuration without substantial stretch thereof, said constriction segment forming an annular passage between an outer surface thereof and an inner surface of said valve body, said annular passage being in fluid communication with said injection port; and,
   (c) injection means coupled to said injection port of said valve body for injecting therethrough a fluid to thereby generate said fluidic force.

2. A fluidically actuable pinch valve module comprising:
   (a) a substantially rigid valve body having distal first and second ends and a wall portion extending therebetween, said valve body having a bore extending axially from said first end to said second end, said valve body having an injection port formed through said wall portion for injection of a fluid therethrough, said injection port being in open communication with said bore;
   (b) a tube member coaxially disposed within said bore, said tube member having a sidewall portion defining an axial passage therethrough, said sidewall portion terminating axially at resilient first and second flanged ends, said first and second flanged ends extending axially beyond and respectively engaging in substantially flush manner said first and second ends of said valve body, said sidewall portion including a flex section, said flex section including at least a pair of deformable annular ridges and a deformable constriction segment disposed therebetween and being reversibly deformable to a pinched configuration responsive to said fluid injection to thereby substantially constrict said axial passage when in said pinched configuration without substantial stretch thereof, said constriction segment forming an annular passage between an outer surface thereof and an inner surface of said valve body, said annular passage being in fluid communication with said injection port.

3. A fluidic pinch valve system comprising:
   (a) a substantially rigid valve body having distal first and second ends and a wall portion extending therebetween, said valve body having a bore extending axially from said first end to said second end, said valve body having an injection port formed through said wall portion, said injection port being in open communication with said bore;

(b) an axially extended tube member disposed within said bore, said tube member having a multi-layered sidewall portion defining an axial passage therethrough, said sidewall portion terminating axially at resilient first and second flanged ends, said first and second flanged ends extending beyond and respectively engaging in substantially flush manner said first and second ends of said valve body, said sidewall portion including a flex section having at least a pair of axially displaced annular ridges and a constriction segment disposed therebetween, said flex section being reversibly deformable to a pinched configuration responsive to a fluidic force, said flex section being adapted to substantially constrict said axial passage when in said pinched configuration; and, (c) injection means coupled to said injection port of said valve body for injecting therethrough a fluid to thereby generate said fluidic force.

4. The fluidic pinch valve system as recited in claim 3 wherein said multi-layered sidewall portion further includes a substantially cylindrical inner layer extending coaxially through said flex section.

5. The fluidic pinch valve system as recited in claim 4 wherein each said first and second flanged end of said tube member has formed thereon an annular flange directed radially outward.

6. The fluidic pinch valve system as recited in claim 5 wherein said annular ridges are extended without substantial stretch thereof when said flex section deforms to said pinched configuration.

7. The fluidic pinch valve system as recited in claim 6 wherein said constriction segment is biased to collapse to a laterally extended sectional contour when said flex section deforms to said pinched configuration.

8. The fluidic pinch valve system as recited in claim 7 wherein said constriction segment has formed therein at least a pair of transaxially opposed creased regions.

9. The fluidic pinch valve system as recited in claim 7 wherein said constriction segment includes at least a pair of transaxially opposed biasing regions, each said biasing region having a thickness dimension less than an average thickness dimension of said constriction segment.

* * * * *